Patented Apr. 30, 1929.

1,711,025

UNITED STATES PATENT OFFICE.

SIDNEY MARION HULL, OF WESTERN SPRINGS, ILLINOIS, ASSIGNOR TO WESTERN ELECTRIC COMPANY, INCORPORATED, OF NEW YORK, N. Y., A CORPORATION OF NEW YORK.

ORGANIC MOLDING COMPOSITION.

No Drawing. Original application filed June 13, 1924, Serial No. 719,742. Divided and this application filed January 29, 1926. Serial No. 84,784.

This invention relates to organic molding compositions and is a division of my copending application, Serial No. 719,742, filed June 13, 1924, Patent No. 1,648,179, Nov. 8, 1927.

In my copending application referred to above, reference is made to the production of an improved condensation product by combining casein and furfural and subjecting the mixture to heat and pressure to affect a condensation thereof.

The object of the present invention is to produce a molding composition utilizing the condensation product of a protein and a substantially anhydrous aldehyde.

The invention consists in mixing together the required amounts of protein and aldehyde, such as casein and furfural, and then subjecting them to heat and pressure to cause a more rapid condensation. A filler may be added to the casein before mixing and the compound may be further waterproofed by incorporating therewith another material which is water-resistant per se or in combination with the compound. This water resistant material is added preferably by dissolving it in the furfural before the admixture of the furfural and casein.

Other objects and features of the invention will appear from the following description and will be particularly pointed out in the appended claims.

According to the preferred form of the invention casein or other proteids, such as glue or gelatine in a dry state, are ground to a fine powder and mixed with the required amount of furfural to bring about complete condensation. In forming this preliminary mixture of casein and furfural, there is a great deal of latitude, but a proportion which has given good results is 10 parts of casein to one part of furfural. By varying the amount of furfural used the properties of the final product may be changed and to a certain degree controlled. The ideal condition to obtain optimum properties is to employ proportions of casein and furfural so that after condensation no free furfural or casein will be present. In general tho use of a less amount of furfural gives a softer final product.

When the casein and furfural are mixed together they present the appearance of a moistened mass. This mass may be molded into shape under pressure and while in the press, heat being applied for various lengths of time depending upon the nature of the specific product desired. In general the temperature should be between 175° F. and 225° F. and the pressure should also be consistent with the density required in the final product. The duration of heating may be from 10 minutes to an hour. The material so produced is a hard resilient plastic mass, resembling bakelite, redmanol and similar materials, and a conchoidal glassy fracture is shown when it is broken.

When casein is mixed with furfural the condensation takes place slowly so that sufficient time exists for the satisfactory commercial handling of the material. For instance, a mixture of furfural and casein may be allowed to stand at room temperatures for three or four days before any noticeable hardening results.

The product of the condensation of furfural and casein when produced under heat and pressure is in general considerably more waterproof than other protein-aldehyde compounds. However, in order to increase the resistance to moisture of this product, advantage may be taken of the solvent properties of furfural for a wide variety of materials. For instance, a rosin-glycerol ester may be dissolved in the furfural in the proportion of one to one, and this solution used for the condensation with casein. Using a gum in this form it is spread uniformly throughout the entire mass and renders the plastic quite resistant to moisture. Other materials such as cellulose-esters; various gums and resins, either natural or synthetic; bituminous materials; tung oil and other polymerizable oils with or without being previously heat treated; waxes and the like may be incorporated in the same manner. Other solvents than furfural may be used for dissolving and distributing the waterproofing agents, but when other solvents are used it is preferable that they be inert, organic, volatile and miscible in all proportions with furfural. Such solvents may be acetone, benzene and its homologues, or other well-known organic solvents.

In forming a compound of the type described, inert fillers may be incorporated for the purpose of reducing the cost of the product and otherwise changing its properties. A satisfactory manner of introducing the fillers into the compound is to grind them with the casein or mix them in any satisfactory manner, before the admixture of the casein and furfural. As an alternative when conditions and the type of materials used might require the furfural and casein might be mixed first and the mixture kneaded with the filler so as to obtain an even distribution throughout. Inert materials which may be used satisfactorily in this connection may be slate dust, magnesia, infusorial earth, wood flour, asbestos fibre, mica dust and other similar materials.

As an example of the foregoing, a composition which would incorporate the main features of the invention as described above, may be produced in the following manner: 50 parts of finely ground casein are thoroughly mixed with 40 parts of finely ground slate dust and the whole intimately mixed with 5 parts of furfural in which has been previously dissolved an equal weight, (5 parts). of a rosin-glycerol ester. The resultant moist plastic mass is then molded under 2500 pounds pressure per square inch with simultaneous application of heat at 212° F. for about 30 minutes. The material so formed is a hard, dense substance, resembling natural slate in appearance, but lighter in weight, possessing considerable resiliency and a fair degree of mechanical strength.

The particular features of importance in the invention are that the molding time is much shorter than for other protein-aldehyde compounds, and articles can be molded to form, there being practically no shrinkage or distortion. The manufacture of molded articles from, for instance, casein and formaldehyde requires sometimes as much as a month's time and then additional time is required for drying. Articles can be molded in the manner and from the materials disclosed herein in two hours; and since the water evolved during the chemical reaction is the only water present, and this is very small, no time is needed for drying. The material formed from the condensation of casein with furfural on account of its comparatively slight hygroscopicity may be employed as an electrical insulator, or for fabricating articles which are preferably resistant to the passage of electricity. In general the material may be employed to fashion articles which are usually made of bone, horn, ivory, celluloid or the like.

The term "substantially anhydrous" in the foregoing description and in the appended claims is used to designate a substance which is not strictly anhydrous in the physical chemical sense of the word but which may contain water only as an impurity and not as a diluent.

What is claimed is:

1. A method of producing a plastic compound which consists in combining a protein in the dry state, substantially anhydrous furfural, and a waterproofing agent, and then bringing about a condensation of the protein and furfural.

2. A method of producing a plastic compound which consists in combining substantially dry casein, substantially anhydrous furfural, and a waterproofing agent, and then bringing about a condensation of the casein and furfural.

3. A method of producing a plastic compound which consists in dissolving a waterproofing agent with substantially anhydrous furfural, and then condensing a protein in the dry state with the resulting furfural solution.

4. A method of producing a plastic compound which consists in dissolving a waterproofing agent in furfural, and then condensing casein with the resulting furfural solution.

5. A method of producing a plastic compound which consists in mixing an inert material with a protein in the dry state, and then condensing said protein with substantially anhydrous furfural.

6. A method of producing a plastic compound which consists in mixing an inert material with substantially dry casein, and condensing said casein with substantially anhydrous furfural.

7. A method of producing a plastic compound which consists in mixing an inert filler with a protein, dissolving a waterproofing agent in substantially anhydrous furfural, then combining the resulting mixture and the resulting solution, and bringing about a condensation of the protein with the substantially anhydrous aldehyde.

8. A method of producing a plastic compound which consists in combining an inert material, a protein in the dry state, substantially anhydrous furfural and a waterproofing agent, and then bringing about a condensation of the protein with the furfural.

9. As a new composition of matter, a plastic compound formed by the admixture of a protein in the dry state, substantially anhydrous furfural, and a waterproofing agent.

10. As a new composition of matter, a plastic compound comprising a condensation of substantially dry casein with substantially anhydrous furfural, and a waterproofing agent.

11. As a new composition of matter, a plastic compound formed by the admixture of a protein in the dry state, substantially anhydrous furfural and an inert filler.

12. As a new composition of matter, a plastic compound formed by the admixture of substantially dry casein, substantially anhydrous, furfural, and an inert filler.

13. As a new composition of matter, a plastic compound formed by the admixture of a protein, in the dry state, substantially anhydrous furfural, an inert filler, and a waterproofing agent.

14. As a new composition of matter, a plastic compound formed by the admixture of substantially dry casein, substantially anhydrous furfural, an inert filler, and a waterproofing agent.

15. A method of producing a plastic compound, which consists in dissolving a rosin-glycerol ester in furfural, and then condensing casein with the resulting solution.

16. A method of producing a plastic compound, which consists in mixing an inert filler with casein, dissolving a waterproofing agent in furfural, then combining the resulting mixture and the resulting solution, and bringing about a condensation of the casein with the furfural.

17. A method of producing a plastic compound, which consists in mixing slate dust with casein, dissolving a rosin-glycerol ester in furfural, then combining the resulting mixture and the resulting solution, and bringing about a condensation of the casein with the furfural.

18. As a new composition of matter, a plastic compound formed by the admixture of about 10 parts of dry casein, about 1 part of substantially anhydrous furfural, and about 1 part of a rosin-glycerol ester.

19. As a new composition of matter, a plastic compound formed by the admixture of casein, furfural, slate dust, and a rosin-glycerol ester.

20. As a new composition of matter, a plastic compound composed of 50 parts of casein, 40 parts of slate dust, 5 parts of substantially anhydrous furfural, and 5 parts of a rosin-glycerol ester.

In witness whereof, I hereunto subscribe my name this 20th day of January, A. D. 1926.

SIDNEY MARION HULL.